Patented Dec. 17, 1940

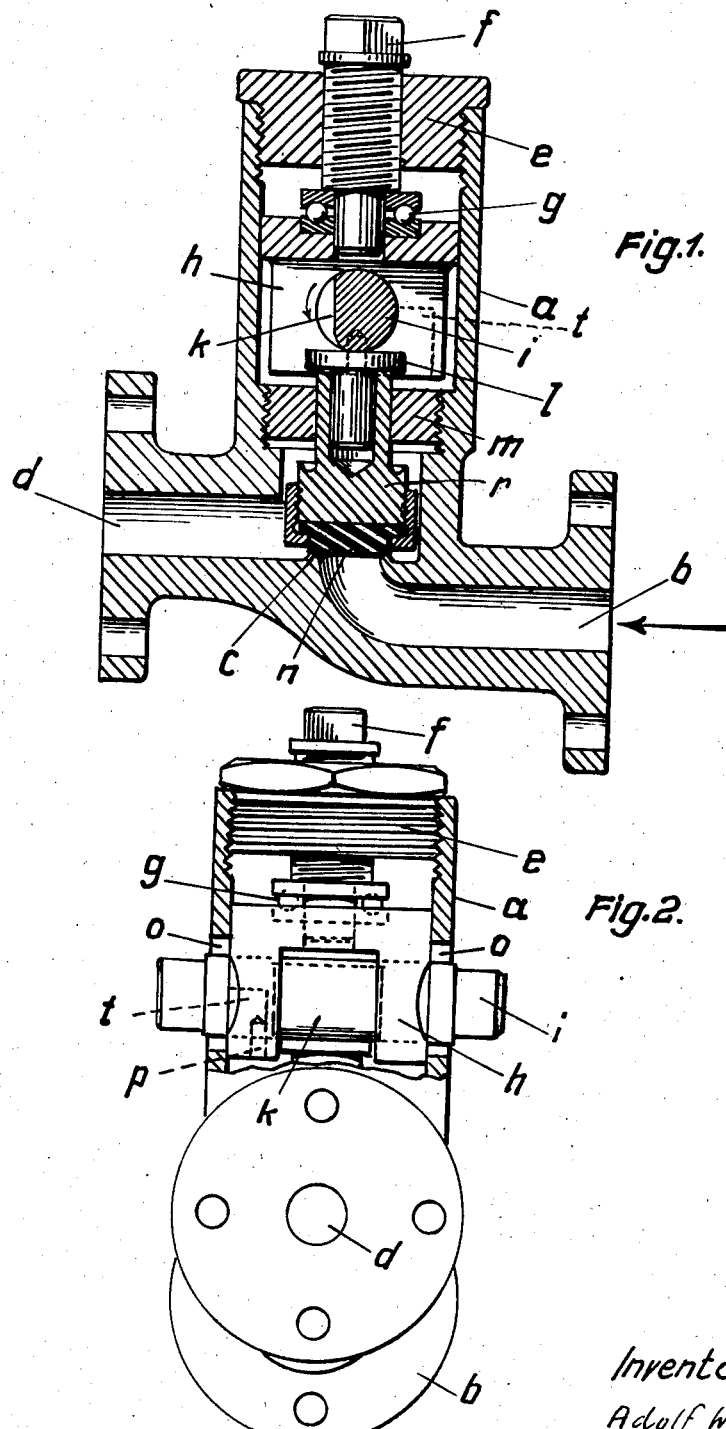

2,225,541

UNITED STATES PATENT OFFICE 2,225,541

QUICK OPENING AND CLOSING VALVE

Adolf Werner, Opladen, Germany

Application August 8, 1939, Serial No. 289,019
In Germany August 8, 1938

2 Claims. (Cl. 251—39)

This invention relates to quick opening and closing valves primarily suitable for compressed gases.

The valves of this kind, hitherto in use, have two main disadvantages. They require the exertion of great force for opening and closing them and the members which coact with the valve seatings are sometimes not pressed on their seatings with that certainty and reliability, which is necessary for producing a completely tight closure. On the contrary, slight displacements may occur, which may cause the valve to chatter. Such valves required frequent re-adjustment. In most cases, however, even this did not overcome the disadvantage, as, according to the discovery on which the invention is based, the pressure on the tight-jointing disc is an unequal one, owing either to canting or other displacements within the valve, which cannot be compensated.

The present invention provides a quick opening and closing valve, the characteristic feature of which resides in this, that, instead of cams or cam discs being used as hitherto, the opening and closing is effected by a direct pressure transmission, for instance by means of a flattened shaft, the shaft being made capable of adjustment in the axial direction of the valve through being guided in a longitudinal slot of the casing and being made capable of being held by a fork supported in the casing in close contact against the member coacting with the valve seating by means of an adjustable screw and a ball bearing.

The ball bearing equalises any unequal pressure distributions and thereby assists in producing a tight valve closure.

The use of a flattened shaft as the valve actuating means has as compared with the aforesaid cams and cam discs the advantage of having a smaller radius, so that the closing operation can be effected with little force.

A constructional example of the arrangement according to the invention is illustrated in the accompanying drawing, in which Fig. 1 is a vertical central section and Fig. 2 a front elevation with the valve casing in vertical section.

The valve housing bears the reference $a$. The compressed gases enter at $b$ from where, when the valve is open, they flow across the seating $c$ and pass to the outlet $d$.

$e$ is a closing plug, through which a pressure-applying screw $f$ extends, which bears against the ball bearing $g$. The ball bearing itself is mounted in a forked member $h$, through the limbs of which the shaft $i$ which is flattened at $k$ extends. The shaft is guided in longitudinal slots $o$ of the housing. When the valve is closed, the shaft bears without clearance on the pressure plate $l$ of the member $r$ which coacts with the valve seating and the lower end of which carries the tight jointing body $n$. The member $r$ which coacts with the valve seating is guided in a screwed-in piece $m$.

The shaft is capable of being turned only within a range of 90°. The extreme positions are determined by a pin $p$ which is fixed in the shaft and which within a recess $t$ on one of the limbs of the forked member limits the corresponding angular path by striking against the sides of the recess.

The described valve is easy to operate, owing to the direct pressure transmission at the flattened shaft $i$. On the shaft being turned in the sense of the arrow marked in Fig. 1 through 90°, the member $r$ which coacts with the valve seating is raised by the highly tensioned gases, so that the latter can escape at $d$. The forked member $h$ thus remains in an unchanged position, just as the other parts of the valve. On the shaft being turned back again through 90° the closure of the valve takes place, also with only a slight application of force, the valve seating being closed absolutely securely.

A special advantage is, that, when using the arrangement according to the invention, the tight closure can always be maintained in a reliable manner, as, on the pressure-applying screw $f$ being screwed down further, the pressure is equalised by the interposed ball bearing, so as always to act uniformly right down to the jointing member. Comparative experiments have shown that the ball bearing always acts in the manner described.

What I claim is:

1. A quick opening and closing valve comprising a cam member, a valve body carrying a packing, said cam member being adapted to bear on said valve body to move the latter in one direction and being also movable out of contact with the valve body, a forked member rotatably receiving said cam, a screw for axially shifting the forked member and cam, and a ball bearing between said screw and said forked member.

2. A quick opening and closing valve comprising a rotatable shaft flattened on one side to present a cam-like formation, a valve body carrying a packing, said shaft being adapted to bear on said valve body to move the latter in one direction and movable to a position to present the flattened side to the valve body, whereby the latter may open, a forked member rotatably receiving said shaft, a screw for axially shifting said forked member, and a ball bearing between said screw and said forked member.

ADOLF WERNER.